(12) United States Patent
Langford et al.

(10) Patent No.: US 6,266,420 B1
(45) Date of Patent: Jul. 24, 2001

(54) METHOD AND APPARATUS FOR SECURE GROUP COMMUNICATIONS

(75) Inventors: Glenn C. Langford; Ian H. Curry, both of Kanata (CA)

(73) Assignee: Entrust Technologies Limited, Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/169,242

(22) Filed: Oct. 8, 1998

(51) Int. Cl.[7] ................... H04L 9/08; H04L 9/30
(52) U.S. Cl. ............. 380/282; 380/277; 380/279; 713/155
(58) Field of Search .................... 380/277, 278, 380/279, 281, 286; 713/155, 156, 157, 150, 175, 158

(56) References Cited

U.S. PATENT DOCUMENTS 5,402,490 * 3/1995 Mihm, Jr. ................. 380/21
5,663,896 * 9/1997 Aucsmith ............. 395/187.01
6,105,134 * 8/2000 Pinder et al. ............. 713/170

OTHER PUBLICATIONS

Kaufman et al., "Network Security: Private Communication in a Public World," 1995, pp. 253–254.*
Schneier, "Applied Cryptography, Second Edition:☐☐Protocols, Algorithms, and Source Code in C," Oct. 18, 1995, pp. 220–222.*

* cited by examiner

*Primary Examiner*—Tod Swann
*Assistant Examiner*—Justin T. Darrow
(74) *Attorney, Agent, or Firm*—Vedder, Price, Kaufman & Kammholz

(57) ABSTRACT

A method for securing group communications with reduced message overhead begins by initiating a secure group communication, where a group communication is secured based on security credentials of the group. The secured group communication is then provided to members of the group, where the secured group communication includes a secured message portion and an overhead portion based on the group, not each member. Each member of the group that receives the message determines that the secured message is group communication for its particular group. Each member then obtains at least a portion of the security credentials (e.g., the private decryption key) of the group to decrypt the secured group communication.

31 Claims, 3 Drawing Sheets

METHOD AND APPARATUS FOR SECURE GROUP COMMUNICATIONS

TECHNICAL FIELD OF THE INVENTION

This invention relates generally to secure communications and more particularly to securing group communications.

BACKGROUND OF THE INVENTION

Securing data, such as digitized voice, digitized video, computer data (e.g., e-mail, files, programs), etc., for transmission may be done in a variety of ways. For example, the data may be encrypted using an encryption algorithm, such as the Data Encryption Standard (DES), with a symmetric key. Once the data is encrypted, it is provided to a receiving party, or parties, where each receiving party uses its own copy of the symmetric key to decrypt the encrypted message. The sending and receiving parties may discard the symmetric key after one transmission or use it for a plurality of transmissions. Data secured and transmitted in this manner provides reliable security as long as the symmetric key is known only by the sending and receiving parties. As such, a critical issue with symmetric key encryption is providing the symmetric key to all parties without compromising its security. Note that the security of a symmetric key is compromised when an unauthorized party has obtained it.

Another encryption process utilizes public/private key pairs that includes, for each party, a private decryption key and a public encryption key. The set of key pairs for a user, or security credentials, may further include a private signature key and a public signature verification key. The public encryption key and the public signature verification key are publicly available, such that a sending party may obtain the public encryption key for each targeted recipient. As in the previous example, the message is encrypted using an algorithm such as DES and a symmetric key. The public encryption keys for all of the desired recipients are then obtained.

The symmetric key is then "wrapped" for each recipient. To wrap a symmetric key, it is encrypted using the public key of a recipient. This process is repeated for each recipient, and the resulting wrapped keys are placed in the security header. The receiving party locates his copy of the wrapped key by the key identifier in the header. The recipient can then decrypt the symmetric key using his private key. In this way, multiple recipients can each locate their wrapped copy of the symmetric key, unwrap the key, and then use the symmetric key to decrypt the message. This scheme allows the symmetric key to be distributed along with the secured data, accessible only to recipients selected by the sender. To further enhance the security of the transmission, the sending party may digitally sign the message using its private signature key.

To facilitate the transmission of a secure message to a plurality of recipients, the sending party may access a recipient list, which includes the identity of each member of a particular group. For example, in a company, a recipient list may include members of an accounting department, another list for finance, another list for engineering, etc. As such, when a sending party wishes to transmit a secure message to the members of a group, it accesses the appropriate recipient list to identify each of the targeted recipients. Client software (i.e., the encryption software incorporated into the computer operated by the user), interprets the recipient list, obtains the encryption keys for each of the recipients (typically from a directory) and individually encrypts the message for each.

If the recipient list is relatively small (e.g., approximately 10 or less), the overhead processing of individually encrypting symmetric keys for the members identified in the recipient list is not significant. As the number of recipients increases, however, the processing by the client software as well as the amount of data generated increases proportionately. For example, since the average electronic mail message is quite short, the processing overhead of creating the wrapped keys for each recipient grows with the size of the recipient list. Also, the size of the secured message header (containing a wrapped key for each recipient) grows to the point where the security header may exceed the size of the message itself by a very large degree.

Therefore a need exists for a method that minimizes data and processing overhead when providing secured group communications.

DETAILED DESCRIPTION OF A PREFERRED EMBODIMENT

Generally, the present invention provides a method for securing group communications with reduced message overhead. Such processing begins by initiating a secure group communication, where a group communication is secured using the security credentials of the group. The secured group communication is then provided to members of the group, where the secured group communication includes a secured message portion and a security header portion based on the group, not each member. For example, if a message is sent to a group that consists of 100 members, the header will contain the symmetric key wrapped only with the public key of the group. Each member of the group that receives the message determines that the secured message is group communication for its particular group. Each member then obtains at least a portion of the security credentials (e.g., the private decryption key) of the group to decrypt the secured group communication. Note that a single message could be sent to multiple groups simultaneously; in this case, the header contains a wrapped symmetric key for each group. With such a method and apparatus, group communications are secured and transmitted using security credentials of the group. As such, the data overhead that accompanies each secured message is substantially reduced in comparison with expanding the recipient list and securing the communication using the security credentials of each of the members.

Figure 1:
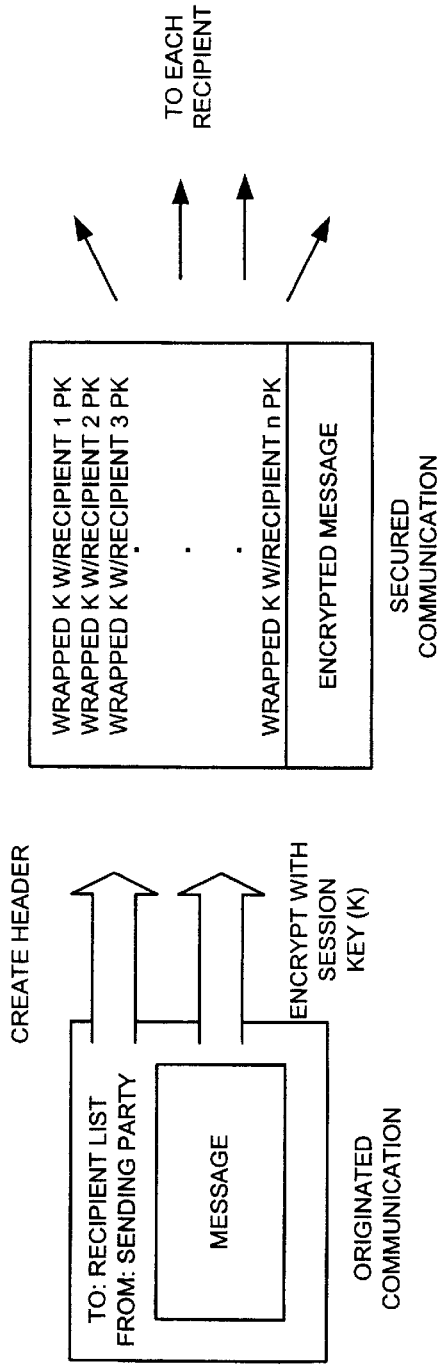
FIG. 1 illustrates a graphical representation of the generation of a secured group communication in accordance with the prior art.

The present invention can be more fully described with reference to FIGS. 1 through 4. FIG. 1 illustrates a graphical representation of generating a secured group communication in accordance with the prior art. As shown, the originated communication includes a message portion, an address to the recipient list and the identity of the sending party. The message portion of the originated communication is encrypted based on a session key (K). Client software generates the security header portion of the originated communication based on the recipient list. In particular, the client software wraps the session key (K) using the encryption public key of each recipient identified in the recipient list. As shown, the header portion of the secured communication may be substantially larger than the encrypted message portion depending on the number of recipients. Once the secured message has been created, it is sent to each of the recipients. As such, a substantial amount of overhead data is transmitted to each of the recipients. For any given recipient, the overhead consists of the copies of the wrapped session key (K) for all of the other recipients in the header.

Figure 2:
FIG. 2 illustrates a graphical representation of generating a group communication in accordance with the present invention.

FIG. 2 illustrates a graphical representation of generating a secured group communication in accordance with the present invention. As shown, the originated communication 10 includes a message portion 12, the identity of a recipient list 14, and the identity of the sending party 16. The message portion 12 is encrypted using the session key K and stored as the encrypted message 20. The recipient list 14 is utilized to identify a group and to obtain a group public encryption key, which is used to create a wrapped session key. The resulting secured group communication 18 includes the encrypted message portion 20 and a single wrapped session key portion (i.e., the data message header), 22. The secured communication 18 is then provided to the plurality of recipients identified in the recipient list 14. By transmitting the secured communication 18, as opposed to the secured communication of the prior art, substantially less data is being transmitted for large numbers of recipients.

When a recipient receives the secured group communication 18, it accesses its user profile 24. The user profile is a user-specific data storage medium The user profile 24 includes an individual private decryption key 26, an individual signature key 28, and a group private decryption key 30. As the secured group communication is received, the recipient determines that it is a group communication and thus accesses the group private decryption key 30. Having retrieved the group private decryption key 30, the recipient is able to decrypt the encrypted message 20. Note that it is common for a user to be a member of more than one group at any given time, so multiple group private decryption keys for different groups could be added to the user profile. A user is said to have accumulated security credentials, which consist of the user's own security credentials, plus any group security credentials. The receiving party may obtain the group private decryption key(s) in a variety of ways, which will be discussed subsequently.

Figure 3:
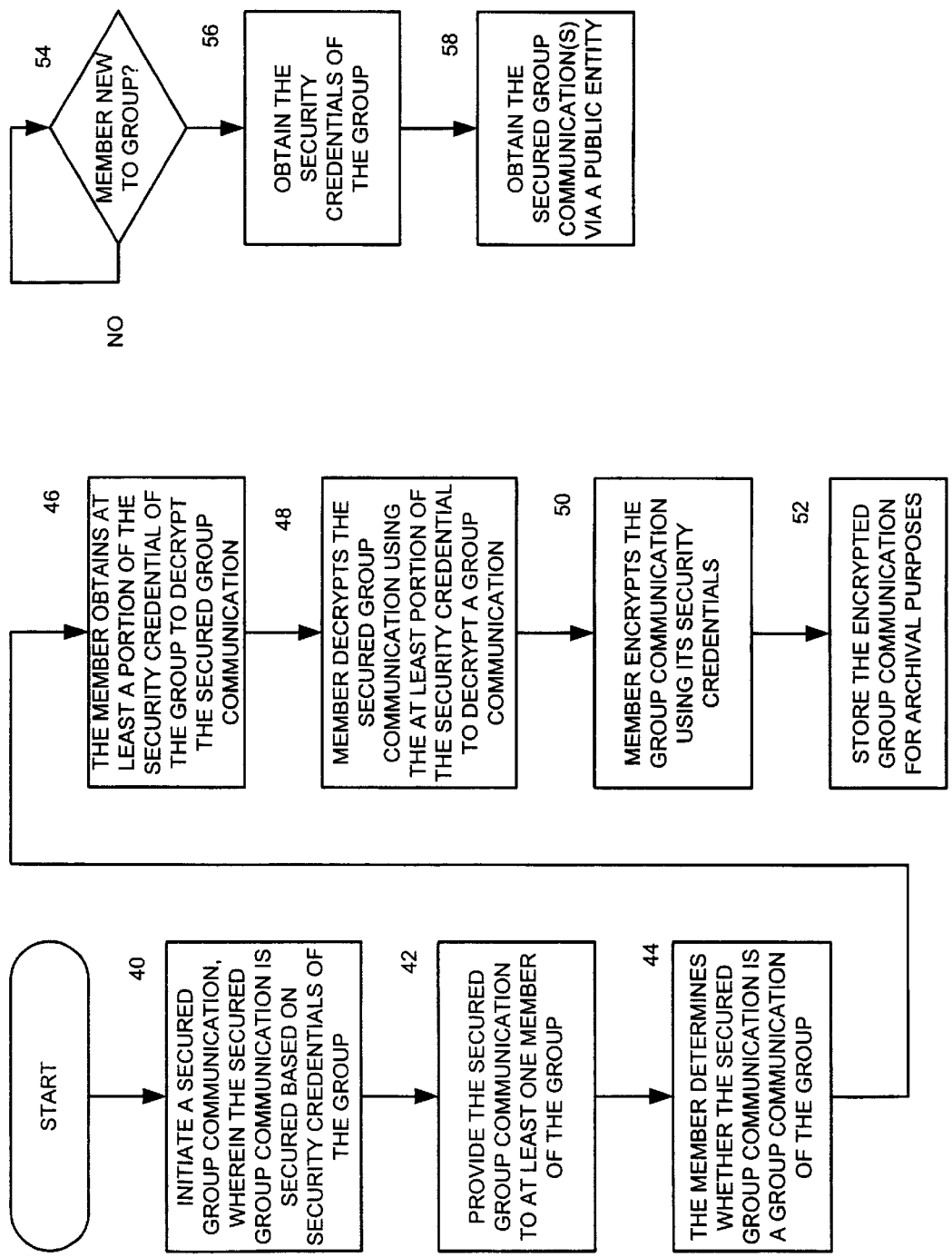
FIG. 3 illustrates a logic diagram of a method for securing a group communication in accordance with the present invention.

FIG. 3 illustrates a logic diagram of a method for processing secured group communications in accordance with the present invention. The process begins at step 40 where a secured group communication is initiated and secured based on security credentials of the group. The group security credentials include at least a public encryption key, and a private decryption key. The security credentials for the group may be created in the same way as for any user of the system; an administrator may act on behalf of the group to create the security credentials. A public key certificate for the group may be published in a directory system as part of the creation of the group security credentials. Within a secured group communication, a unique key identifier that is independent of the identifiers used to identify the individual members of the group identifies the group. Note that to create a secured group communication, the public encryption key of the group security credentials may be obtained by accessing a public key certificate for the group from a directory.

The process then proceeds to step 42 where the secured group communication is provided to at least one member of the group. The members of the group may receive the secured group communication from a public entity, such as a web page that posts, distributes and otherwise makes the message available, from a public folder, from a server, etc. The process then proceeds to step 44 where the member of the group determines whether the secured group communication is a group communication for a particular group. Such a determination is made by reviewing the key identifier in the header of the message, if the identifier identifies the group, it is a group message, if it identifies the party, it is an individual message.

The process then proceeds to step 46 where the member of the group obtains at least a portion of the security credentials of the group (eg. the group's private decryption key) to decrypt the secured group communication. Note that only group members may obtain the private decryption key of the group. The security credentials may be obtained by accessing the individual member's security credentials that include at least a portion of the security credentials of the group. This was illustrated with reference to FIG. 2. Alternatively, the security credentials of the group may be received via a secured message that was secured using at least a portion of the security credentials of the member. Having obtained the security credentials of the group via the secured message, the member would merge the security credentials of the group into its individual security credentials. As yet another alternative, an individual member may receive the security credentials of the group in response to a request. As still a further example, the security credentials of the group may be received from a group administrator, which may be a separate entity, for example a system server, or one of the members functioning as the administrator.

The process then proceeds to step 48 where the member decrypts the secured group communication using the group security credentials to decrypt the group communication. The process then may proceed to optional step 50 where the member re-encrypts the decrypted group communication using its individual security credentials. The process then proceeds to step 52 where the newly encrypted group communication is stored for archival purposes. The optional steps 50 and 52 would be performed by a recipient member to ensure that past messages can be accessed by the user if and when the recipient member loses access to his profile. This may be caused my accidental erasure, or because the user has forgotten his password, etc. In any event, the security credentials are lost and have to be reissued. When this occurs, communications that were encrypted using previous security credentials of the group would not be retrievable since those security credentials were lost by the group member. As such, by re-encrypting group communications utilizing the individual security credentials of the recipient, it can archive past group communications securely and decrypt them when needed, without retrieving the past security credentials of the group.

FIG. 3 also illustrates processing steps for when a new member is added to the group. The process begins at step 54 where a determination is made as to whether a new member is added to the group. If yes, the process proceeds to step 56 where the new member obtains the security credentials for the group. The process then proceeds to step 58 where the new member obtains the secured group communication via a public entity. As such, a new member will be able to access the most current security credentials of the group and any messages originated by members of the group that were secured using the current group security credentials.

Figure 4:
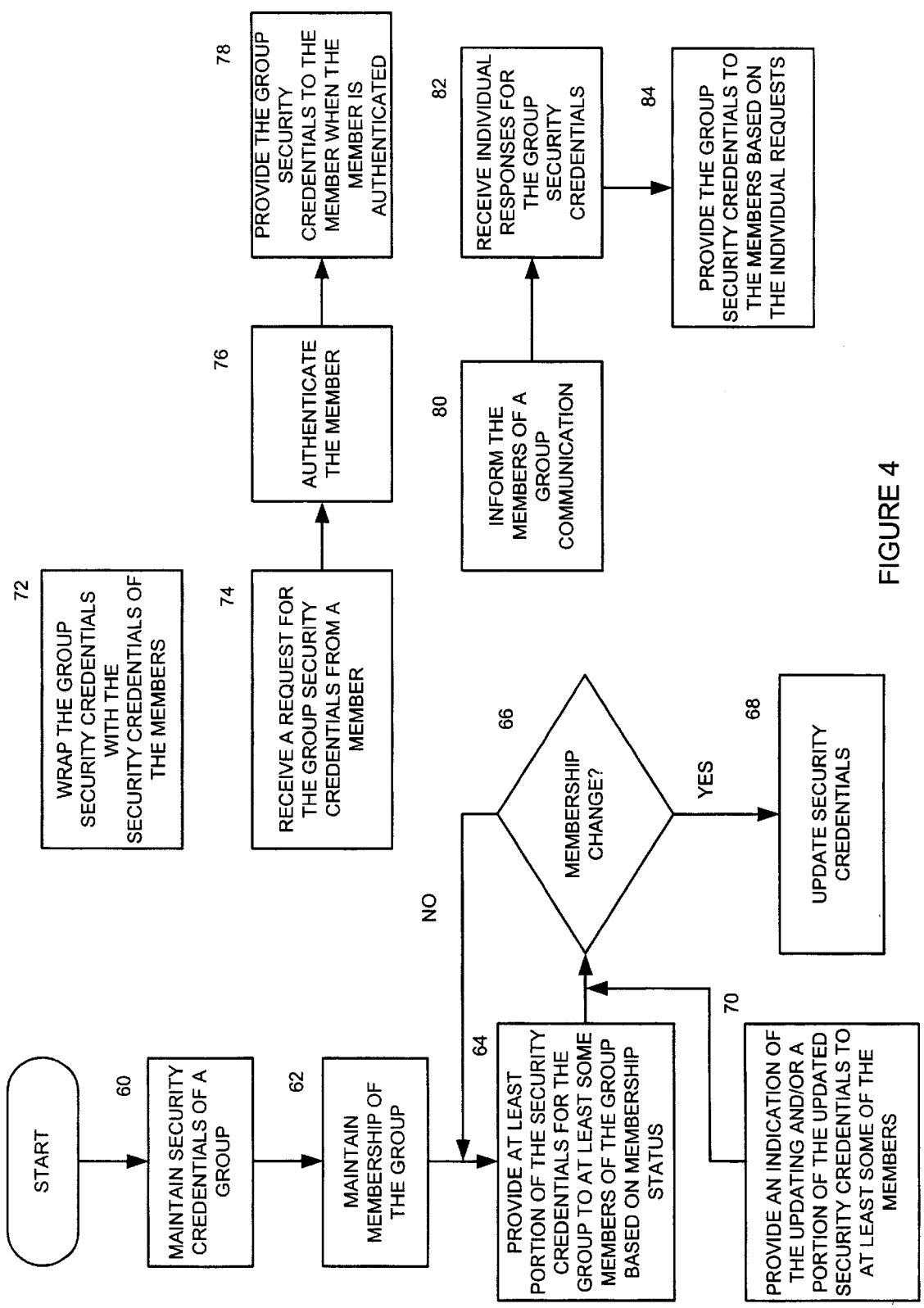
FIG. 4 illustrates a schematic block diagram for administering secured group communications in accordance with the present invention.

FIG. 4 illustrates a logic diagram of a method for maintaining secured group communications in accordance with the present invention. The process begins at step 60 where an administrative entity maintains security credentials of the group. The security credentials of the group include at least the public encryption key, and a private decryption key. The process then proceeds to step 62 where the administrative entity maintains the membership of the group.

The process then proceeds to step 64 where the administrative entity provides at least a portion of the security credentials (e.g., the private decryption key) for the group to at least some members of the group based on the membership status. As such, the administrative entities will provide, either directly, upon request, or in response to group communications, the security credentials to members of the group. In essence, the administrative entity distributes the group private key to only the group members who requested the key or to all members regardless of whether they requested the key. If the group private key is provided to the group members without them requesting it, the distribution may be done when the group is created, changed, or otherwise processed. The process then proceeds to step 66 where a determination is made as to whether the membership has changed. If not, the process remains in a loop of steps 64 and 66.

If, however, the membership has changed, the process proceeds to step 68. At step 68, the security credentials of the group are updated. Such updating may include generating new security credentials (creating new key pairs), revoking an old group public key certificate, creating a new public key certificate, changing the membership listing, or a combination of these. The process then proceeds to step 70 where the administrative entity provides an indication of the updating and/or a portion of the updated security credentials to at least some of the members. Note that, the process may jump from the processing steps 66–70 to perform any of the other steps.

Step 64 may be performed in a plurality of ways as illustrated by steps 72–84. One technique for providing the group security credentials to the members is shown at step 72 where the group security credentials are wrapped utilizing the individual security credentials of the members. Another technique for providing the group security credentials is shown at step 74 where the processing entity receives a request for the group security credentials from a member. The process then proceeds to step 76 where the administrative entity authenticates the requesting member. The process then proceeds to step 78 where the administrative entity provides the group security credentials to the member when the member has been authenticated. As yet another mechanism for providing the group security credentials to the individual users, the processing entity, at step 80, may inform the members of a group communication. The process then proceeds to step 82 where the administrative entity receives individual responses for the group security credentials. The process then proceeds to step 84 where the administrative entity provides the group security credentials to the members based on their individual requests.

The operational instructions illustrated in FIGS. 3 and 4 may be programming instructions that are stored on a digital storage medium such as a computer's system memory, floppy disk, hard disk, memory chip, DVD memory, CD memory and/or any device that stores digital information.

The preceding discussion has presented a method and apparatus for reducing the overhead when transmitting secured group communications. By reducing the secured message overhead, a secured communication system may operate more efficiently since the effective bandwidth has been increased.

What is claimed is:

1. A method for secure group communications, the method comprises the steps of:
    a) initiating a secured group communication, wherein the secured group communication is secured based on a group public encryption key of security credentials of the group;
    b) providing the secured group communication to at least one member of the group; and
    c) obtaining, by the at least one member, at least a portion of the security credentials of the group that include a private key of the group to decrypt the secured group communication.

2. The method of claim 1, wherein step (a) further comprises:
    identifying the group based on a group identity independent of members' identities.

3. The method of claim 1, wherein step (b) further comprises:
    providing the secured group communication to a public entity; and
    obtaining the secured group communication by the at least one member via the public entity.

4. The method of claim 3 further comprises:
    adding a new member to the group subsequent to providing the secured group communication to the public entity;
    obtaining the security credentials of the group by the new member; and
    obtaining the secured group communication by the new member via the public entity.

5. The method of claim 1, wherein step (c) further comprises obtaining the at least a portion of the security credentials of the group by:
    accessing security credentials of the at least one member, which include the at least a portion of the security credentials of the group, wherein the at least a portion of the security credentials include a private key for the group.

6. The method of claim 5 further comprises:
    receiving the at least a portion of the security credentials of the group as a secured message, wherein the secured message was secured via at least a portion of accumulated security credentials of the at least one member; and
    merging the at least a portion of the security credentials of the group into the security credentials of the at least one member.

7. The method of claim 6 further comprises:
    receiving the at least a portion of the security credentials in response to at least one of:
    requesting, independent of the secured group communication, the at least a portion of the security credentials; and
    requesting the at least a portion of the security credentials in response to receiving the secured group communication.

8. The method of claim 6 further comprises receiving the at least a portion of the security credentials via a group administrator.

9. The method of claim 1 further comprises:
    decrypting the secured group communication using the at least a portion of the security credentials to recapture a group communication;

encrypting the group communication using the security credentials of the at least one member to produce a resecured group communication; and storing the resecured group communication.

10. The method of claim 1, wherein step (a) further comprises obtaining the group public key of the group by accessing a directory.

11. A method for an administrator to facilitate secured group communications, the method comprises the steps of:
   a) maintaining security credentials of a group that include a private key of the group;
   b) maintaining membership status of the group; and
   c) providing at least a portion of the security credentials for the group including a group public encryption key to at least some members of the group.

12. The method of claim 11, wherein step (c) further comprises:
   securing the at least a portion of private security credentials for the group with at least one key corresponding to at least a portion of accumulated security credentials of the at least some members.

13. The method of claim 11, wherein step (c) further comprises:
   receiving a request for the at least a portion of the security credentials from a member of the at least some of the members;
   authenticating the member; and
   when the member is authenticated, securing the at least a portion of the security credentials with at least a portion of accumulated security credentials of the member.

14. The method of claim 11, wherein step (c) further comprises:
   receiving a request for the at least a portion of the security credentials from a member of the at least some of the members when the member receives a secured group communication;
   authenticating the member; and
   when the member is authenticated, providing, for the secured group communication, the at least a portion of the group security credentials.

15. The method of claim 11 further comprises:
   updating the security credentials of the group when the membership status changes.

16. The method of claim 15 further comprises at least one of:
   providing an indication of the updating of the security credentials to the at least some members; and
   providing at least a portion of updated security credentials to the at least some of the members.

17. A method for participating in a secure group communication, the method comprises the steps of:
   a) receiving a secured group communication, wherein the secured group communication is secured based on a group public encryption key of security credentials of a group;
   b) determining that the secured group communication is a group communication of the group; and
   c) obtaining at least a portion of the security credentials of the group that include a private key of the group to decrypt the secured group communication.

18. The method of claim 17, wherein step (c) further comprises obtaining the at least a portion of the security credentials by:
   accessing an individual's accumulated security credentials, which include the at least a portion of the security credentials of the group.

19. The method of claim 18 further comprises:
   receiving the at least a portion of the security credentials of the group as a secured message, wherein the secured message was secured via at least a portion of the individual's accumulated security credentials; and
   merging the individual security credentials with the at least a portion of the security credentials of the group.

20. The method of claim 19 further comprises:
   receiving the at least a portion of the security credentials in response to at least one of:
   requesting, independent of the secured group communication, the at least a portion of the security credentials;
   requesting the at least a portion of the security credentials in response to receiving the secured group communication; and
   changing at least one of: the security credentials and the membership status of the group.

21. The method of claim 17 further comprises:
   decrypting the secured group communication using the at least a portion of the accumulated security credentials;
   encrypting the group communication using the individual security credentials to produce a resecured group communication; and
   storing the resecured group communication.

22. A digital storage medium that stores programming instructions that, when read by a processing module, cause the processing module to facilitate a secured group communication, the digital storage medium comprises;
   a first digital storage means for storing programming instructions that cause the processing module to maintain security credentials of a group that includes a private key of the group;
   a second digital storage means for storing programming instructions that cause the processing module to maintain membership status of the group; and
   a third digital storage means for storing programming instructions that cause the processing module to provide at least a portion of the security credentials for the group including a group public encryption key to at least some members of the group.

23. The digital storage medium of claim 22 further comprises programming instructions that cause the processing module to:
   securing the at least a portion of the security credentials with at least one key corresponding to at least a portion of accumulated security credentials of the at least some members.

24. The digital storage medium of claim 22 further comprises programming instructions that cause the processing module to:
   receive a request for the at least a portion of the security credentials from a member of the at least some of the members;
   authenticate the member; and
   secure the at least a portion of the security credentials with at least a portion of accumulated security credentials of the member when the member is authenticated.

25. The digital storage medium of claim 22 further comprises programming instructions that cause the processing module to:
   receive a request for the at least a portion of the security credentials from a member of the at least some of the members when the member receives a secured group communication;

authenticate the member; and provide, for the secured group communication, the at least a portion of the group security credentials when the member is authenticated.

26. The digital storage medium of claim 22 further comprises programming instructions that cause the processing module to:

update the security credentials of the group when the membership status changes; and at least one of:

providing an indication of the updating of the security credentials to the at least some members; and providing at least a portion of updated security credentials to the at least some of the members.

27. A digital storage medium that stores programming instructions that, when read by a processing module, cause the processing module to facilitate a secured group communication, the digital storage medium comprises:

a first digital storage means for storing programming instructions that cause the processing module to receive a secured group communication, wherein the secured group communication is secured based on a group public encryption key of security credentials of a group;

a second digital storage means for storing programming instructions that cause the processing module to determine that the secured group communication is a group communication of the group; and a third digital storage means for storing programming instructions that cause the processing module to obtain at least a portion of the security credentials of the group that include a private key of the group to decrypt the secured group communication.

28. The digital storage medium of claim 27 further comprises programming instructions that cause the processing module to obtain the at least a portion of the security credentials by:

accessing an individual's accumulated security credentials, which include the at least a portion of the security credentials of the group.

29. The digital storage medium of claim 27 further comprises programming instructions that cause the processing module to:

receive the at least a portion of the security credentials of the group as a secured message, wherein the secured message was secured via at least a portion of the individual's accumulated security credentials; and merge the individual security credentials with the at least a portion of the security credentials of the group.

30. The digital storage medium of claim 27 further comprises programming instructions that cause the processing module to:

receive the at least a portion of the security credentials in response to at least one of:

request, independent of the secured group communication, the at least a portion of the security credentials;

request the at least a portion of the security credentials in response to receiving the secured group communication; and changing at least one of the security credentials and the membership status of the group.

31. The digital storage medium of claim 27 further comprises programming instructions that cause the processing module to:

decrypt the secured group communication using the at least a portion of the security accumulated credentials to recapture a group communication;

encrypt the group communication using the individual security credentials to produce a resecured group communication; and store the resecured group communication.

\* \* \* \* \*